Oct. 17, 1961  J. K. MATTHEWS  3,004,513
MACHINE FOR DUSTING AND HANDLING BAKER'S PEELS
Filed March 4, 1960  3 Sheets-Sheet 1

INVENTOR.
JOHN K. MATTHEWS
BY

ATTORNEY

Oct. 17, 1961  J. K. MATTHEWS  3,004,513
MACHINE FOR DUSTING AND HANDLING BAKER'S PEELS
Filed March 4, 1960  3 Sheets-Sheet 2

INVENTOR.
JOHN K. MATTHEWS
BY
ATTORNEY

Oct. 17, 1961  J. K. MATTHEWS  3,004,513
MACHINE FOR DUSTING AND HANDLING BAKER'S PEELS
Filed March 4, 1960  3 Sheets-Sheet 3
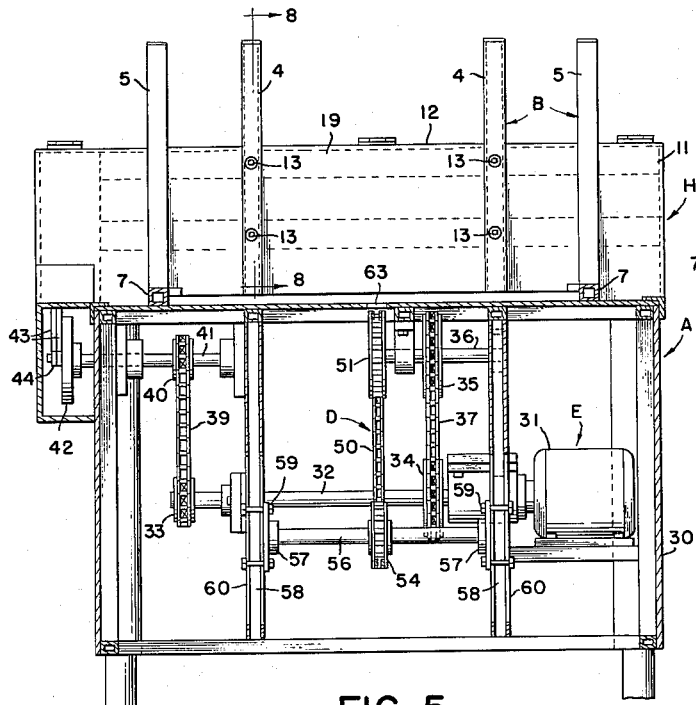
FIG. 5.
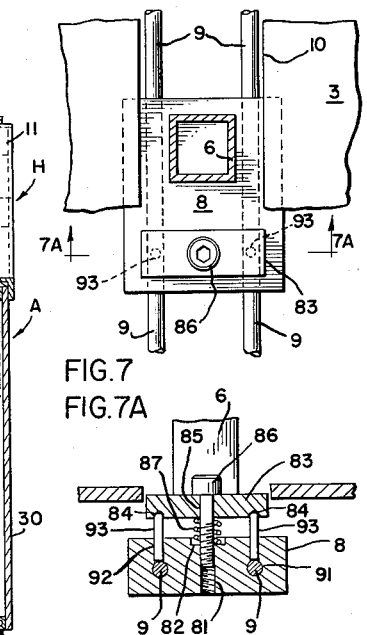
FIG. 7
FIG. 7A
FIG. 8.
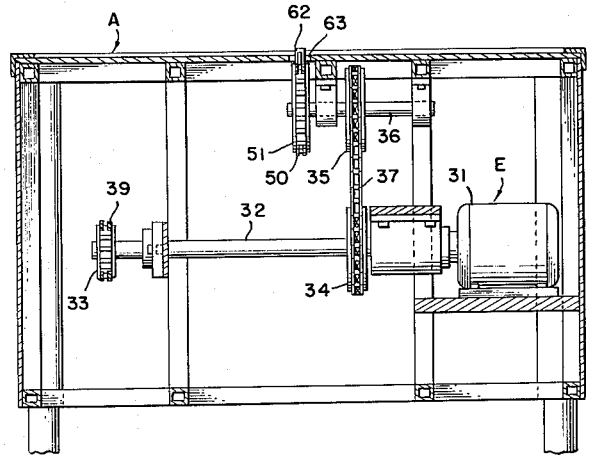
FIG. 6.
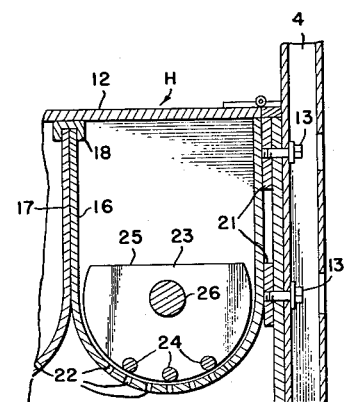
INVENTOR.
JOHN K. MATTHEWS
BY
ATTORNEY

United States Patent Office 3,004,513
Patented Oct. 17, 1961

3,004,513
MACHINE FOR DUSTING AND HANDLING
BAKER'S PEELS
John K. Matthews, Scranton, Pa., assignor to
Alfred Norris, Wyoming, Pa.
Filed Mar. 4, 1960, Ser. No. 12,814
7 Claims. (Cl. 118—2)

This invention relates to machinery for use in bakeries, and especially to a machine for automatically delivering baker's peels to a station ready to receive dough for baking.

The object of this invention is to provide a machine to perform the several operations of handling baker's peels, thus saving the time and labor of several manual operations. The machine automatically discharges a peel from the stack, dusts it with flour or the like and presents it at the loading station where the dough is placed on it and it is removed to the oven, the next peel immediately moving to the station.

In the drawings:

FIG. 5 is a sectional view on line 5—5 of FIG. 4.

FIG. 6 is a sectional view on line 6—6 of FIG. 4.

FIG. 7 is a sectional view on line 7—7 of FIG. 4.

FIG. 7A is a sectional view on line 7A—7A of FIG. 7.

FIG. 8 is another fragmentary sectional view, showing further constructional details, taken on line 8—8 of FIG. 5.

Figure 1:
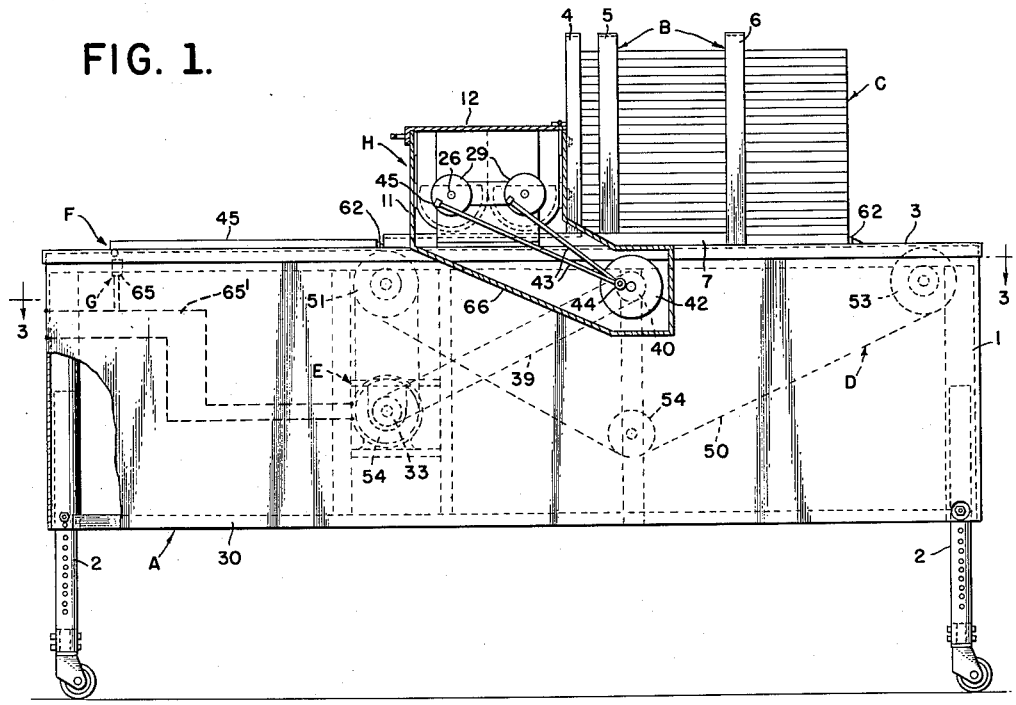
FIG. 1 is a side elevation of the apparatus embodying the invention, showing certain elements in section.

The apparatus disclosed herein as one embodiment of the invention consists of a support structure A on which are mounted stack holding members B to maintain a stack of baker's peels C, and a conveyor mechanism D operated by a power source E to move peels successively from said stack to a loading station F, where a control member G discontinues activation of said conveyor on engagement by said peel. In addition, there is also provided a dusting mechanism H having operating elements driven by power source E, to dust flour or similar material on each peel as it passes to the loading station F.

The support structure A as shown is in the form of a table 1 having adjustable legs 2, and a top 3, on which are mounted uprights 4, 5, 6 to maintain the stack C of peels. The uprights 5, 6 on each side are fixed to a rail 7, this assembly being slidable laterally of the table to adjust the spacing between the rails and uprights for accommodating stacks of peels of different widths. For purpose of adjustment, each upright 6 is fixed to a base 8 slidable on transverse rods 9 below the top of the table. A slot 10 in the top allows lateral movement of each upright 6.

Each base 8 is formed with horizontal openings 91 through which the rods 9 extend and with vertical openings 92 intersecting said horizontal openings 91 in which are placed pins 93. The base 8 is provided with a threaded vertical opening 81 between the vertical openings 92, the upper end of said threaded opening being enlarged to form a socket 82. A clamp member 83 is formed with sockets 84 for the upper ends of pins 93 and an opening 85 to receive a cap screw 86. A spring 87 seats in the socket 82 and engages the under side of clamp member 83. Upon tightening up the screw 86, the clamp member 83 causes pins 93 to engage rods 9 and lock the base 8 against movement. When screw 86 is loosened, the spring 87 releases clamp member 83 and allows the base member 8 with upright 6 and rail 7 to be adjusted laterally, where it may be again locked in the adjusted position.

The dusting mechanism includes a casing 11 secured to the table and closed by hinged lid 12. The bottom edges of the rear and front walls of casing 11 are cut out to provide space above the table surface 3 for the rails 7 and for passage of a peel, as shown in FIG. 5. The rear wall also carries the uprights 4 spaced above the table surface for the same purpose, screws 13 threaded into transverse plates 21 securing these uprights in place, as shown in FIG. 8.

This casing contains the hoppers 14 and 15 for holding and sifting flour or like material. It is often desirable to use two different kinds of flour or meal for dusting, which may be provided for by use of two hoppers. These hoppers have contiguous side walls 16, 17 secured to each other and are further connected by channel member 18. The rear wall 19 and front wall 20 of the rear and front hoppers 14 and 15, respectively, are secured through transverse plates 21 to the corresponding walls of casing 11. Each hopper is formed with perforations 22 in the bottom, and inside is mounted an agitator 23 consisting of a plurality of rods 24 fixed in end plates 25 and mounted on shaft 26. Each shaft 26 is journaled at 27, 28 in supports at opposite ends of the casing and carries a disk 29, fixed to one end for oscillating the agitator.

The main operating mechanism is mounted on a framework of tubular members forming part of the supporting structure below the top surface. Walls 30 extend down from the top to enclose this mechanism. The power source E includes motor 31 driving shaft 32 and sprockets 33, 34. Sprocket 34 drives sprocket 35 on shaft 36 through chain 37 and sprocket 33 drives sprocket 40 on shaft 41 through chain 39.

To operate the agitators of the dusting mechanism, shaft 41 driven by sprocket 40 carries a disk 42. This rotating disk has two links 43 connecting to disks 29 on the agitator shafts. These links are connected to disk 42 by a single bolt or pivot 44, which is located much closer to the center of the disk than the connections 45 of the links 43 are to centers of disks 29. As a result, rotation of disk 42 only produces a partial rotation of disks 29, thereby oscillating the agitators 23 to cause sifting of flour or like material from hoppers 14, 15. The pivot connection 44 on disk 42 is disconnectible so that only one hopper may be used.

For moving a peel 45 from the bottom of the stack and under the dusting mechanism H to the loading station F, a conveyor mechanism is provided comprising a chain 50 encircling drive pulley 51 on shaft 36 and idler sprockets 53 and 54. Sprocket 53 is journaled on a fixed stub shaft 55, while sprocket 54 is mounted on a short shaft 56 secured to supports 57 on standards 58 for vertical adjustment to allow tightening of chain 50. Suitable bolts 59 extend through supports 57 and slots 60 in the standards 58 to clamp the shaft in adjusted position.

The chain 50 carries spaced pusher elements 62 for engaging a peel on the bottom of the stack. A stretch of the chain extends along a slot 63 in the table top 3, so that pusher elements 62 may move along the slot above the surface of the table and move a peel 45 out from the stack C and convey it past the dusting mechanism H to the loading station F. A control element in the form of a tiltable switch 65 in the motor circuit 65' is positioned at the loading station F to be engaged by the peel 45 and tilted to cut off the motor 31, thereby discontinuing operation of the conveyor apparatus and the dusting mechanism. This switch is a conventional type of switch which opens the circuit when tilted and closes the circuit automatically by assuming normal position when disengaged.

Figure 2:
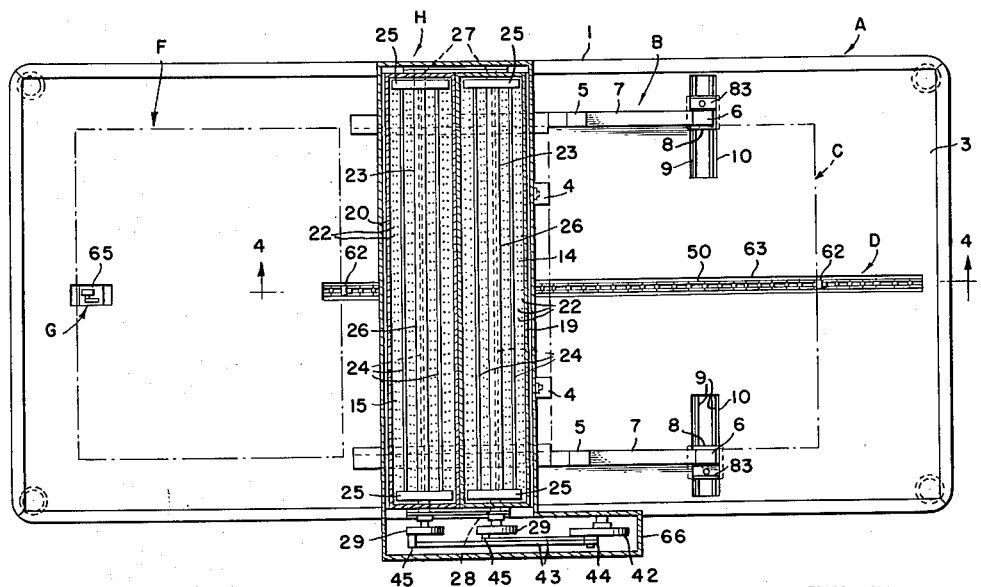
FIG. 2 is a top plan view of the apparatus shown in FIG. 1, also showing certain elements in section.
Figure 2:
Figure 3:
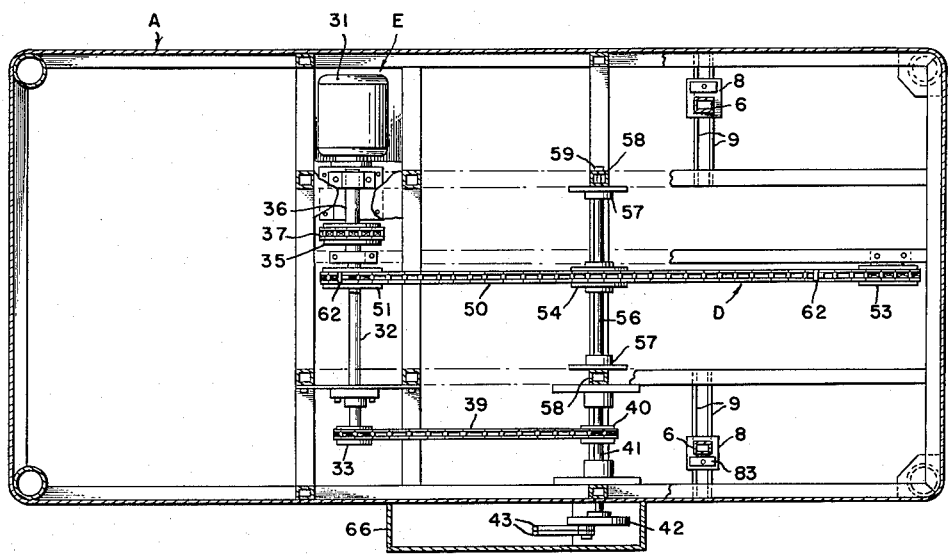
FIG. 3 is a sectional view on line 3—3 of FIG. 1, showing certain of the operating mechanism in plan.
Figure 4:
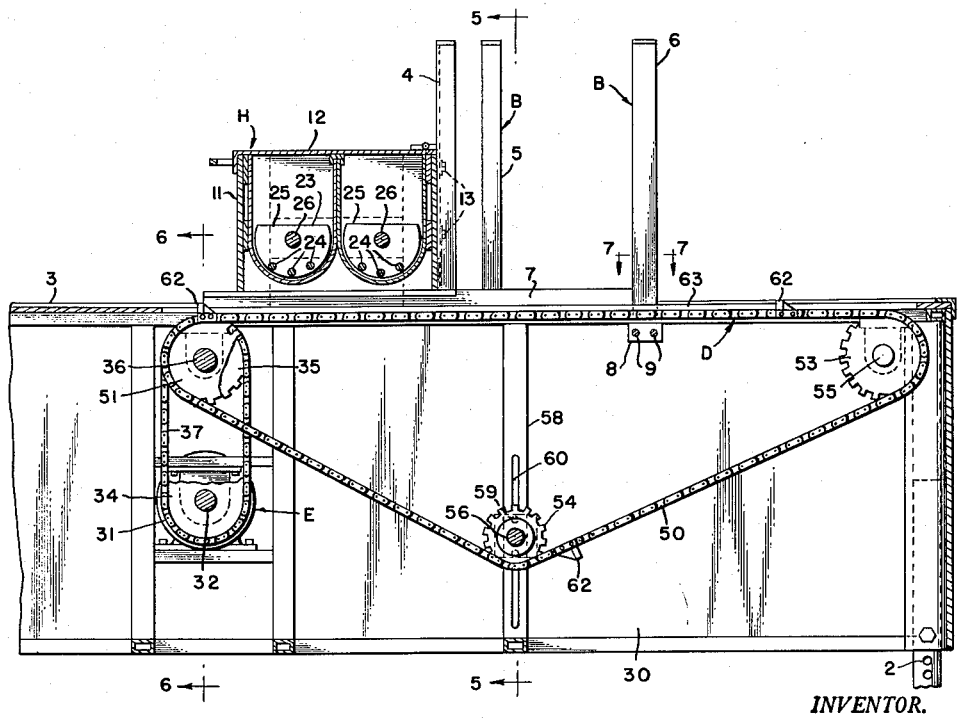
FIG. 4 is a sectional view on line 4—4 of FIG. 2.

As may be seen in FIG. 2, the casing 11 is open on the end, so that the operating disks are accessible. A cover 66 is provided to enclose this operating mechanism, as shown in this figure and FIG. 1.

The operation will be clear from the above description. When operation is started, the motor drives chain 50 and through a pusher 62 moves a peel 45 from the bottom of stack C under the operating dusting mechanism H to the loading station F, where the peel tilts switch 65 and discontinues motor operation. After the dough is placed on the peel, the peel is removed and the switch closes to start another cycle. While the motor is conveying the peel past the dusting mechanism H, it is also operating the agitators 23, thereby sifting the material in the hoppers on to the peel. When the motor is stopped, this action ceases so that no flour is wasted.

As peels are made of different widths, the 5 and 6 uprights and rails 7 may be adjusted transversely to accommodate peels of any width. The top of the supporting structure and all other surfaces exposed to the food may be made of stainless steel or other easily cleaned material, for convenience and sanitation.

The specific structure described discloses one preferred embodiment of the invention, the characteristics of which are set forth in the following claims.

I claim:

1. In a machine for successively dusting and positioning baker's peels at a loading station, a support structure having a top horizontal surface, stack holding means comprising a plurality of uprights for maintaining a stack of peels on said support structure and a loading station spaced from said stack holding means, conveyor mechanism for moving said peels successively from said stack to said loading station, dusting mechanism positioned above the path of movement of said peels to discharge material on to said peels on passage beneath said mechanism to said station, a pair of rails on said supporting structure extending alongside said stack of peels and along the path of said peels toward said loading station to guide said peels in said path, each of said rails being secured to at least one of said uprights to form a laterally confining structure for said peels, said top surface having a transverse slot adjacent each edge, guide means comprising transverse guide members mounted on said support structure beneath said slots, each said confining structure having a portion extending through one of said slots and slidably engaging said guide means to provide lateral adjustment for each of said rails and upright secured thereto, and means to secure said confining structure in position on said guide means, a power source to operate said conveyor mechanism and said dusting mechanism, and control means normally effective to activate operation of said conveyor mechanism and said dusting mechanism and actuated by a peel at said loading station to discontinue said operation of said conveyor mechanism and said dusting mechanism by said power source, so that removal of a peel at said loading station automatically causes operation of the dusting mechanism and delivery of the next peel to the loading station.

2. In a machine for successively dusting and positioning baker's peels at a loading station, a support structure having stack holding means comprising a plurality of uprights for confining a stack of peels on said support structure, and a loading station spaced from said stack holding means, conveyor mechanism for moving said peels successively from said stack to said loading station, dusting mechanism positioned above the path of movement of said peels to discharge material on to said peels on passage beneath said mechanism to said station, said dusting mechanism including a housing mounted on said support structure above the path of movement of said peels, said housing having rear and front vertical walls, the lower edges of said walls being spaced from said support structure above the path of said peels to allow passage of said peels, certain of said uprights of said stack holding means being secured to said rear wall of said housing with their lower ends spaced above said path of said peels, a power source to operate said conveyor mechanism and said dusting mechanism, and control means normally effective to activate operation of said conveyor mechanism and said dusting mechanism and actuated by a peel at said loading station to discontinue said operation of said conveyor mechanism and said dusting mechanism by said power source, so that removal of a peel at said loading station automatically causes operation of the dusting mechanism and delivery of the next peel to the loading station.

3. In a machine for successively dusting and positioning baker's peels at a loading station, a support structure having stack holding means comprising a plurality of uprights for maintaining a stack of peels on said support structure and a loading station spaced from said stack holding means, conveyor mechanism for moving said peels successively from said stack to said loading station, dusting mechanism positioned above the path of movement of said peels to discharge material on to said peels on passage beneath said mechanism to said station, said dusting mechanism being spaced above the path of movement of said peels to provide passage of said peels, a pair of rails on said supporting structure extending alongside said stack of peels and through the space beneath said dusting mechanism to guide said peels in said path, each of said rails having at least one of said uprights secured thereto to confine said stack laterally of said support structure, a power source to operate said conveyor mechanism and said dusting mechanism, and control means normally effective to activate operation of said conveyor mechanism and said dusting mechanism and actuated by a peel at said loading station to discontinue said operation of said conveyor mechanism and said dusting mechanism by said power source, so that removal of a peel at said loading station automatically causes operation of the dusting mechanism and delivery of the next peel to the loading station.

4. In a machine for successively dusting and positioning baker's peels at a loading station, a support structure having stack holding means for maintaining a stack of peels on said support structure and a loading station spaced from said stack holding means, said support structure having a horizontal surface formed with a transverse slot adjacent each edge and guide means comprising transverse guide members on said structure below said slots, said stack holding means including a transversely adjustable member at each side having a portion extending through said slot slidably adjustable on said guide means and a plurality of spaced uprights extending above said surface, conveyor mechanism moving said peels successively from said stack to said loading station, dusting mechanism positioned above the path of movement of said peels to discharge material on to said peels on passage beneath said mechanism to said station, a power source to operate said conveyor mechanism and said dusting mechanism, and control means normally effective to activate operation of said conveyor mechanism and said dusting mechanism and actuated by a peel at said loading station to discontinue said operation of said conveyor mechanism and said dusting mechanism by said power source, so that removal of a peel at said loading station automatically causes operation of the dusting mechanism and delivery of the next peel to the loading station.

5. In a machine for successively dusting and positioning baker's peels at a loading station, a support structure having stack holding means for maintaining a stack of peels on said support structure and a loading station spaced from said stack holding means, said support structure having transversely extending guide means adjacent each side and said stack holding means including an upright at each side slidably mounted on said guide means so that the width of said stack holding means may be adjusted to accommodate stacks of peels of different widths, conveyor mechanism for moving said peels successively from said stack to said loading station, dusting mechanism positioned above the path of movement of said peels to discharge material on to said peels on passage beneath said mechanism to said station, a power source to operate said conveyor mechanism and said dusting mechanism, and control means normally effective to activate operation of said conveyor mechanism and said dusting mechanism and actuated by a peel at said loading station to discontinue said operation of said conveyor mechanism and said dusting mechanism by said power source, so that removal of a peel at said loading station automatically causes operation of the dusting mechanism and delivery of the next peel to the loading station.

6. In a machine for successively dusting and positioning baker's peels at a loading station, a support structure having stack holding means for maintaining a stack of peels on said support structure and a loading station spaced from said stack holding means, conveyor mechanism for moving said peels successively from said stack to said loading station, dusting mechanism positioned above the path of movement of said peels to discharge material on to said peels on passage beneath said mechanism to said station, a power source to operate said conveyor mechanism and said dusting mechanism, and control means normally effective to activate operation of said conveyor mechanism and said dusting mechanism and actuated by a peel at said loading station to discontinue said operation of said conveyor mechanism and said dusting mechanism by said power source, so that removal of a peel at said loading station automatically causes operation of the dusting mechanism and delivery of the next peel to the loading station.

7. In a machine for successively dusting and positioning baker's peels at a loading station, a support structure having stack holding means for maintaining a stack of peels on said support structure and a loading station spaced from said stack holding means, conveyor mechanism for moving said peels successively from said stack to said loading station, said support structure having a horizontal top surface and a central longitudinal slot in said surface extending along the path of movement of said peels, said conveyor mechanism including a chain having spaced pushers thereon movable along said slot and projecting above said top surface to engage the bottom peel of said stack and move it to said loading station, dusting mechanism positioned above the path of movement of said peels to discharge material on to said peels on passage beneath said mechanism to said station, a power source to operate said conveyor mechanism and said dusting mechanism, and control means normally effective to activate operation of said conveyor mechanism and said dusting mechanism and actuated by a peel at said loading station to discontinue said operation of said conveyor mechanism and said dusting mechanism by said power source, so that removal of a peel at said loading station automatically causes operation of the dusting mechanism and delivery of the next peel to the loading station.

References Cited in the file of this patent

UNITED STATES PATENTS

| | | |
|---|---|---|
| 1,767,633 | Weber et al. | June 24, 1930 |
| 2,027,523 | Erbe | Jan. 14, 1936 |
| 2,126,784 | Kott | Aug. 6, 1938 |
| 2,828,714 | Sandberg | Apr. 1, 1958 |